(12) United States Patent
Signoriello et al.

(10) Patent No.: US 10,724,588 B2
(45) Date of Patent: Jul. 28, 2020

(54) METALLIC SUPPORT FOR A BRAKING ELEMENT AND ASSOCIATED BRAKE PAD

(71) Applicant: ITT ITALIA S.r.l., Lainate (IT)

(72) Inventors: Roberto Signoriello, Barge (IT); Maurizio Calderoni, Barge (IT); Pietro Bertoldo, Barge (IT)

(73) Assignee: ITT ITALIA S.r.l. (IT)

( * ) Notice: Subject to any disclaimer, the term of this patent is extended or adjusted under 35 U.S.C. 154(b) by 29 days.

(21) Appl. No.: 16/078,259

(22) PCT Filed: Feb. 23, 2017

(86) PCT No.: PCT/IB2017/051041
§ 371 (c)(1),
(2) Date: Aug. 21, 2018

(87) PCT Pub. No.: WO2017/145088
PCT Pub. Date: Aug. 31, 2017

(65) Prior Publication Data
US 2019/0063523 A1    Feb. 28, 2019

(30) Foreign Application Priority Data
Feb. 23, 2016    (IT) .................... 102016000018679

(51) Int. Cl.
*F16D 65/097*    (2006.01)
*F16D 65/00*    (2006.01)
(Continued)

(52) U.S. Cl.
CPC .......... *F16D 65/097* (2013.01); *B21D 28/26* (2013.01); *F16D 65/0006* (2013.01);
(Continued)

(58) Field of Classification Search
CPC .... F16D 65/092; F16D 65/095; F16D 65/097; F16D 65/006; F16D 65/0979;
(Continued)

(56) References Cited

U.S. PATENT DOCUMENTS 3,693,764 A * 9/1972 Anders ................ F16D 65/092
188/73.1
4,513,844 A * 4/1985 Hoffman, Jr. ....... F16D 65/0006
188/264 G
(Continued)

FOREIGN PATENT DOCUMENTS

DE    10 2008 013 268 A1    4/2009
DE    10 2009 020 521 A1    5/2011
(Continued)

OTHER PUBLICATIONS

International Search Report and Written Opinion for PCT/IB2017/051041; dated Jun. 6, 2017; 12 pgs.

*Primary Examiner* — Thomas J Williams
(74) *Attorney, Agent, or Firm* — Barclay Damon LLP

(57) ABSTRACT

A metallic support of a brake pad delimited between a first and a second face, and having a perimeter edge substantially perpendicular to the first and second faces. The first face receives a block or layer of friction material, and the second face receives a dampening element. The first face has at least one projecting part extending cantilevered spaced apart from the perimeter edge so as to be completely embedded within the block or layer of friction material. The at least one projecting part is delimited at the top by a first surface upon which there is at least one first cavity filled with the block or layer of friction material. The second face has at least one second cavity forged as the at least one projecting part. At the at least one first cavity, there is at least one first relief shaped as the at least one first cavity.

14 Claims, 2 Drawing Sheets

(51) Int. Cl.
*F16D 69/04* (2006.01)
*F16D 65/092* (2006.01)
*F16D 65/12* (2006.01)
*B21D 28/26* (2006.01)

(52) U.S. Cl.
CPC ....... *F16D 65/092* (2013.01); *F16D 65/0979* (2013.01); *F16D 65/121* (2013.01); *F16D 69/04* (2013.01); *F16D 69/0408* (2013.01); *F16D 2069/0441* (2013.01); *F16D 2069/0483* (2013.01); *F16D 2069/0491* (2013.01); *F16D 2200/0021* (2013.01); *F16D 2250/0023* (2013.01)

(58) Field of Classification Search
CPC .. F16D 69/04; F16D 69/0408; F16D 69/0441; F16D 65/0006
USPC .......... 188/250 R, 261, 250 E, 250 F, 250 G, 188/250 B
See application file for complete search history.

(56) References Cited

U.S. PATENT DOCUMENTS

| | | | |
|---|---|---|---|
| 6,267,206 B1* | 7/2001 | Grimme | F16D 65/0006 188/73.1 |
| 6,367,600 B1* | 4/2002 | Arbesman | B21D 28/10 188/250 B |
| 8,544,618 B2 | 10/2013 | Klimt et al. | |
| 9,920,807 B2 | 3/2018 | Borgmeier et al. | |
| 2002/0125081 A1 | 9/2002 | Meyer | |
| 2004/0016608 A1 | 1/2004 | Gutowski | |
| 2005/0034940 A1* | 2/2005 | Roberts | F16D 65/092 188/250 B |
| 2007/0170023 A1 | 7/2007 | Yamamoto | |
| 2011/0220441 A1 | 9/2011 | Zhang | |
| 2013/0199880 A1* | 8/2013 | Jancer | F16D 65/092 188/250 B |
| 2013/0277159 A1* | 10/2013 | Borgmeier | F16D 65/092 188/234 |

FOREIGN PATENT DOCUMENTS

| | | |
|---|---|---|
| DE | 10 2011 001 562 A1 | 9/2012 |
| GB | 2 245 667 A | 1/1992 |
| WO | WO 2010/128133 A1 | 11/2010 |

* cited by examiner

METALLIC SUPPORT FOR A BRAKING ELEMENT AND ASSOCIATED BRAKE PAD

CROSS REFERENCE TO RELATED APPLICATIONS

This application is a national stage application filed under 35 U.S.C. § 371 of International Application No. PCT/M2017/051041, filed Feb. 23, 2017, which claims priority upon Italian Application No. 102016000018679, filed Feb. 23, 2016, the entire contents of each application herein being incorporated by reference.

TECHNICAL FIELD

The present invention relates to a metallic support or "backplate" that can be used to obtain by molding braking elements, such as brake pads, and to an associated brake pad provided with such a metal support.

BACKGROUND ART

It is known that a brake pad is a vehicle wheel braking element that is intended to cooperate with a wheel disc brake and comprises: a metallic support, known as a "backplate", manufactured as a substantially flat plate; a block of friction material, which is molded integral to a first face of the metallic support, possibly together with the interposition of an isolating/damping layer arranged between the block of friction material and the metallic support and known by the term "underlayer;" and a damping element, known by the term "shim," applied to a second face of the metallic support opposite the first face, and against said "shim" in use either a movable driving element or a fixed reaction surface of a brake caliper acts, designed to push in use the block of friction material against the brake disc.

The metallic support is commonly made of steel and is obtained by fine shearing of a sheet of metal of appropriate thickness.

In order to improve the adhesion between the block of friction material and the metallic support, the first face of the support may be provided with projecting parts or cavities, as provided, for example, in US2004016608A1 or in US2011220441A1.

However, such a solution can be relatively expensive to implement, insofar as it usually introduces at least one more plastic deformation operation into the metallic support manufacturing cycle. It can also be indecisive, insofar as it involves only a relatively small increase in adhesion, an increase that is not, furthermore, always uniform over the entire surface of the brake pad, and in that it introduces asymmetries into the arrangement of the mass of the metallic support that may give rise to an uncontrolled modification of the natural frequencies of resonant vibration thereof, possibly resulting in the generation of noise while in use.

GB2245667 relates to a metallic support for brake pads which has projecting parts on the first face obtained by means of plastic deformation imparted by the side of the second face, thus leaving cavities on the side of the second face; this does not therefore resolve any of the aforementioned problems.

DISCLOSURE OF INVENTION

The purpose of the present invention is to provide a metallic support for a vehicle braking element, in particular a brake pad, and a brake pad utilizing such a metallic support, which are free of the described disadvantages and which, in particular, are obtainable by means of a single fine shearing operation of the metallic support, that, at the same time, also improves adhesion of the block or layer of friction material and reduces dimensions, and that makes it possible to obtain effective mounting of the damping element or shim on the face of the metallic support opposite to that provided by the block or layer of friction material.

The invention therefore relates to a metallic support for a braking element, in particular a vehicle brake pad, and to a brake pad using such a metallic support as well as to a method for obtaining the metallic support by means of fine shearing, as defined in the appended claims.

BRIEF DESCRIPTION OF THE DRAWINGS

Further characteristics and advantages of the present invention will become clear from the following description of an exemplary non-limiting embodiment thereof given purely by way of example and with reference to the figures within the accompanying drawings, wherein.

BEST MODE FOR CARRYING OUT THE INVENTION

Figure 1:
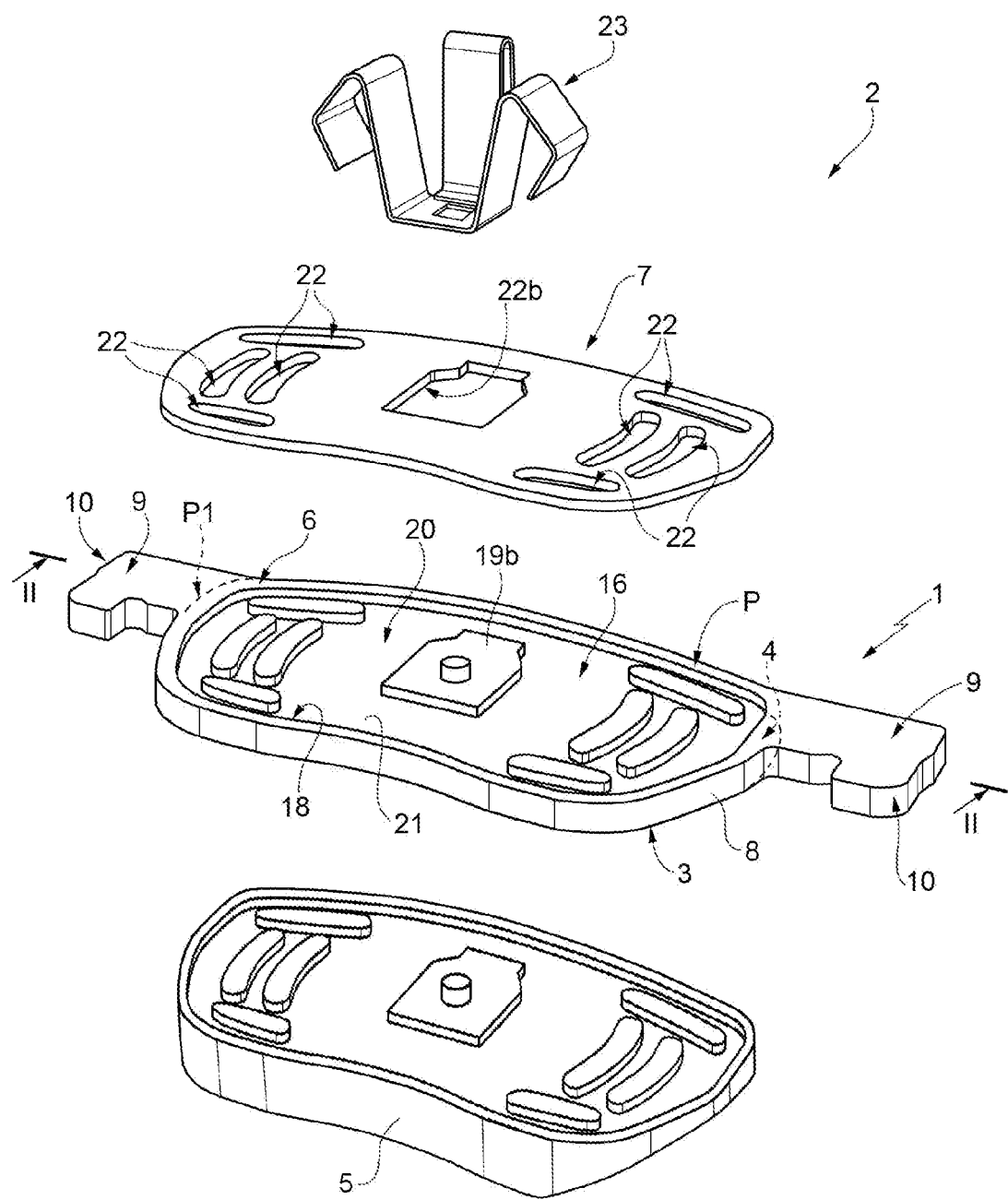
FIG. 1 illustrates an exploded view of a braking element, in particular a brake pad, manufactured according to the invention.
Figure 2:
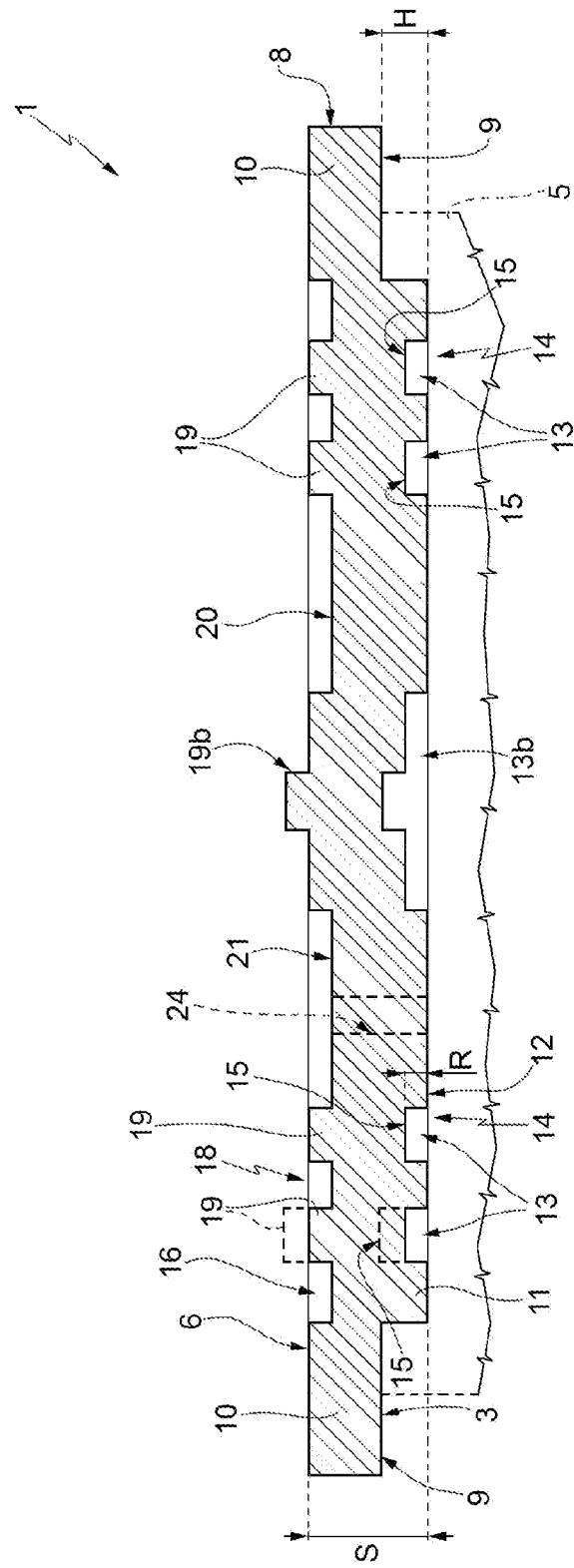
FIG. 2 illustrates, on an enlarged scale, an elevational sectioned view taken along the plane II-II of a metallic support that forms part of the braking element of FIG. 1.

With reference to FIGS. 1 and 2, reference number 1 indicates a metallic support that forms part of a braking element 2 for vehicles, in particular comprising, in the illustrated non-limiting example, a brake pad.

The metallic support 1 according to the invention is designed for obtaining braking elements 2 that are compact, simple and economical to manufacture and have high reliability.

The metallic support 1 comprises a first face 3 designed to receive on one first portion 4 thereof a block or layer 5 of friction material and a second face 6, substantially parallel to the first face 3, designed to receive a dampening element or "shim" 7, both forming part, as shall be seen, of the brake pad or braking element 2, illustrated in FIG. 1 as a three quarter exploded axonometric view from above.

The first face 3 and the second face 6 are laterally delimited by a peripheral edge 8 of the metallic support 1; the edge 8 extending between the first face 3 and the second face 6 in one direction of a thickness S (FIG. 2) of the metallic support 1, said direction being substantially perpendicular to the faces 3 and 6.

The first portion 4 of the face 3 extends partly along a perimeter profile P of the edge 8 and covers the entirety of the face 3 apart from respective opposite lateral portions 9 of the face 3 that delimit respective guide portions 10 of the metallic support 1. In the illustrated non-limiting example, the guide portions 10 are lug or hook shaped, as schematically illustrated with hatching in FIG. 1, but they may more generally have any shape.

According to a first aspect of the invention, the first portion 4 of the first face 3 is provided with at least one projecting part 11 (FIG. 2) that cantilevers from the first face 3 at least partly parallel to the perimeter profile P of the peripheral edge 8 but spaced apart from the peripheral edge 8 and that is delimited at the top by a first surface 12 substantially parallel to the first face 3.

According to the invention, in combination with that which has previously been described, within the at least one projecting part 11, there is provided at least one first cavity 13, defining on the first surface 12 a shallow recess 14 delimited by a bottom wall 15 substantially parallel to the first face 3.

According to a further aspect of the invention, in combination with that which has been previously described, the second face 6 is provided with at least one second cavity 16 defining on the second face 6 a second shallow recess 18 having a form and dimensions substantially identical to those of the at least one projecting part 11 and a depth, measured perpendicularly to the first and second faces 3 and 6, substantially identical to a height H (FIG. 2) of the at least one projecting part 11, measured perpendicularly to the faces 3, 6.

Within the at least one cavity 16 and in correspondence with the at least one first cavity 13, there is present at least one relief 19 having a shape and dimensions substantially identical to those of the at least one first cavity 13 and a height substantially identical to a depth R (FIG. 2) of the cavity 13 measured perpendicularly to the faces 3, 6.

According to a non-secondary aspect of the invention, the projecting part 11 and the corresponding cavity 16 are designed in such a way that the cavity 16 and the at least one relief 19, within the shallow recess 18 delimited by the cavity 16, define a seat 20 for receiving the damping element 7.

The metallic support 1 is manufactured from a sheared steel sheet, and the at least one relief 19, the at least one first and a second cavity 13 and 16 and the at least one projecting part 11 were obtained by plastic deformation with the same fine shearing operation by which the support 1 itself is obtained from the steel sheet, in such a way as to move the same steel mass from the second face 6 (creating the cavity 16) to the first face 3 (creating the projecting part 11); the steel mass part of the support 1 that is not moved consequently creates the at least one relief 19 within the cavity 16 and a corresponding at least one cavity 13 within the projecting part 11 and on the upper surface 12 thereof. It is also possible, depending upon the desired configuration to be obtained, by operating simultaneously or, alternatively, by doing the vice versa, moving part of the steel mass from the first face 3 (for example, by creating the cavities 13) to the second face (for example, by creating the reliefs 19).

According to the preferred embodiment of the invention, which is illustrated in FIGS. 1 and 2, there are present a single projecting part 11 that occupies a substantial part of the first face 3, and in particular of the first portion 4 of the face 3, and a single cavity 16 that occupies a corresponding substantial part of the second face 6.

Here and hereinafter for "substantial part" of a face (3 or 6) or portion of a face (4) of the metallic support 1 it is intended a part of the faces 3 and 6 and/or of the portion 4 of the face 3 equal to or greater that 50% of the total superficial extension of such a face 3, 6 and/or of the portion 4 of the face 3.

According to the preferred embodiment of FIGS. 1 and 2, furthermore, within the single projecting part 11 there is arranged a plurality of cavities 13 defining upon the surface 12 a plurality of shallow recesses 14 spaced apart at which there is, within the single cavity 16 defining the shallow recess 18, a plurality of reliefs 19.

The shallow recesses 14 and the corresponding reliefs 19 have in plan view, according to the illustrated non-limiting embodiment, a straight or half-moon form.

In particular, the at least one or single projecting part 11 is shaped in such a way as to reproduce the whole perimeter profile P1 of the first portion 4 of the first face 3 illustrated schematically with hatching in FIG. 1 and delimited at least in part by the peripheral edge 8. The profile P1 exactly reproduces the profile P and is developed parallel thereto, except at the guide portions 10, towards which said profile delimits the portion 4 of the face 3 intended to receive by molding the block or layer 5 of friction material.

The profile P1 is further shaped in such a way as to remain spaced apart from the perimeter profile P, radially on the inside, so that the at least one projecting part 11 is entirely embedded within the block or layer 5 of friction material.

Preferably, the faces 3, 6, the surface 12, the bottom walls 15 of the cavities 13, and a bottom wall 21 of the cavity 16 (FIG. 2) are substantially flat and parallel to each other.

The metallic support 1 described is an integral part, as illustrated in FIG. 1, of a braking element consisting of a brake pad 2 for a vehicle. It is clear and obvious to the technician skilled in the art that what will be described is however applicable to any type of braking element, and therefore also to a brake shoe.

The brake pad 2 comprises: the metallic support 1 already described, which is in the form of a substantially flat plate delimited between the faces 3, 6, which are substantially flat and parallel to each other, and the peripheral edge 8 substantially perpendicular to the faces 3, 6 and which extends in the direction of the thickness S of the metallic support 1; a block or layer 5 of friction material applied in a known way, for example by molding, on the first portion 4 of the face 3 having profile P1 and which is therefore delimited at least in part by the peripheral edge 8; and a dampening element or "shim" 7 applied to the second face 6.

The portion 4 of the face 3 has the single projecting part 11 or, according to a possible embodiment not shown, a plurality of projecting parts 11 that occupy(ies) a substantial part of the portion 4 and that extend(s) in order to cantilever from the face 3 at least partly parallel to the peripheral edge 8 but is (are) removed from the peripheral edge 8, so that the at least one projecting part(s) 11 is (are) completely embedded within the block or layer 5 of friction material. The projecting part(s) 11 is (are) delimited at the top by the surface 12, which is substantially flat and parallel to the face 3.

Within the single projecting part 11, or within at least one or preferably all of the projecting parts 11 present is arranged at least one cavity 13 or preferably a plurality of cavities 13 that is filled by the block or layer 5 of friction material.

In this way, surprisingly strong adhesion of the block or layer of friction material 5 to the metallic support 1 is obtained, adhesion that, according to the process conditions, is greater than that obtained with the presence of single projecting parts or single cavities on the face 3, and also with the simultaneous presence of projecting parts and cavities on the face 3, but arranged side by side. The adhesion is even better than that achievable with current production standards, wherein the metallic support is smooth on both faces and has only holes that are filled with the friction material.

According to a fundamental aspect of the invention, the second face 6 is provided with the single cavity 16 or, according to one possible embodiment not shown, a plurality of cavities 16, which occupy(ies) a substantial part of the face 6, defining on the face 6 a shallow recess 18/plurality of shallow recesses 18 having shape and dimensions substantially identical to those of the single projecting part 11 or plurality of projecting parts 11 and a depth, measured perpendicularly to the faces 3, 6 substantially identical to the height H of the projecting part(s) 11 measured perpendicularly to the faces 3, 6.

Further, within the cavity(s) 16, there is (are) present, corresponding to the cavity(s) 13, at least one relief/a plurality of reliefs 19 having a shape and dimensions substantially identical to those of the cavity(s) 13 and a height substantially identical to a depth R of the cavity(s) 13 measured perpendicularly to the faces 3, 6.

In this way, the single cavity or plurality of cavities 16 and the relief/plurality of reliefs 19 there within define the seat 20 in which the entirety of the damping element 7 (in the case of a single cavity 15 and a corresponding projecting part 11) or part thereof (in the case of a plurality of cavities 16 and projecting parts 11) is located, according to the shape of the damping element 7.

According to the preferred embodiment, the damping element 7 is manufactured in the form of flat sheet and has at least one perforation 22, in this case a plurality of suitably shaped perforations 22, which has (have) a shape that is conjugated with that of the relief/plurality of reliefs 19 and that engages the same in order to hold the damping element 7 in position within the seat 20.

The cavity(s) 16 has (have) a depth substantially equal to or only slightly less than a thickness of the damping element 7 measured perpendicularly to the faces 3, 6, such that the thickness of the damping element 7 remains wholly or partly within the footprint of the thickness S and therefore compensated for by the thickness S of the metallic support 1. The same is true for the block of friction material 5 and the projecting part 11, whereby part of the thickness of the friction material is within the footprint of the thickness of the metallic support 1. In this way a reduction is obtained in the thickness of the brake pad 2 without a reduction in the overall mechanical resistance and an amount of materials used.

But, above all, the special geometry described makes it possible to obtain, according to the invention, the projecting parts 11 and 19 and the cavities 13 and 16 by means of a single fine shearing operation, while simultaneously obtaining the support 1 starting from a metallic sheet, particularly steel.

The invention thus relates to a method for obtaining a metallic support 1 intended for a vehicle braking element 2, comprising the step of subjecting a steel sheet (not shown for the sake of simplicity) to a fine shearing operation in order to separate from the steel sheet the metallic support 1 delimited between the faces 3 and 6 and the peripheral edge 8, wherein during the fine shearing operation a plastic deformation step of the steel sheet is performed within a perimeter profile P of the metallic support 1 defined by the peripheral edge 8 by means of which plastic deformation step the same mass of steel is moved from the second face 6 to the first face 3 in order to form, simultaneously:

on the first face 3, the at least one projecting part 11 and within the projecting part 11 one or more cavities 13; and on the second face 6, the at least one cavity 16 and, within the cavity 16 and at the cavities 13, one or more projecting parts 19.

In practice, the fine shearing mold is modified in order to obtain simultaneously and with a single operation, together with the shearing of the edge 8, also the formation of the projecting parts 11 and 19 and the cavities 16 and 13. But this is only possible due to the specific and particular geometry described, which makes it possible to balance the reaction forces generated on the various parts of the shearing mold, allowing therefore the whole complex figure of the support 1 to be obtained with a single operation.

The brake pad 2 finally also comprises a reaction spring 23 which is rendered integral to the support 1 by means of a suitable perforation 22b of the damping element 7; in particular, the spring 23 is secured to a projecting part 19b protruding partly cantilevered from the face 6 and outside of the shallow recess 18 and that was obtained by arranging a corresponding cavity 13b on the surface 12 of the projecting part 11 that is deeper than the other cavities 13.

The cavity 13 thickness and the height of the corresponding reliefs 19 is usually chosen such that the top of the reliefs 19 and the bottom wall 21 are substantially flush, respectively, with the face 6 and the face 3; but, according to the variant, illustrated only schematically with hatching in FIG. 2, the cavities 13 can also be arranged more or less deep (and therefore the reliefs 19 more or less high), in such a way as to be aligned offset to the faces 3, 6.

This possibility provides an additional advantage according to the invention. In fact, depending upon the depth chosen for the cavities 13, 13b and depending upon the height chosen for the projecting part 11 and the reliefs 19, it is possible to modulate at will, based upon simple calculations, the natural vibration frequency of the support 1 and also the stiffness thereof. In this way the support 1 can be locally reinforced at those point that are most stressed, and/or unwanted noise or vibration can be avoided.

These possibilities are further enhanced by the possibility of obtaining further modulation by arranging through or blind holes 24 (FIG. 2) through/in the metallic support 1, again by means of a single fine shearing operation.

The objectives of the invention are therefore fully achieved.

The invention claimed is:

1. A metallic support for vehicle braking elements, said metallic support comprising:
   a first face designed to receive on a first portion, a block or layer of friction material; and
   a second face, substantially parallel to the first face, designed to receive a dampening element, the first and the second faces being delimited laterally by a peripheral edge of the metallic support extending between the first and second faces in one direction of a thickness of the metallic support substantially perpendicular to the first and second faces; wherein:
   i)—the first portion of the first face is provided with at least one projecting part that cantilevers from the first face at least partly parallel to a perimeter profile (P) of the peripheral edge, but spaced apart from the peripheral edge and that is delimited at the top by a first surface substantially parallel to the first face;
   ii)—at least one first cavity is within the at least one projecting part and defines on the first surface, a first shallow recess delimited by a bottom wall substantially parallel to the first face;
   iii)—wherein the second face is provided with at least one second cavity defining on the second face, a second shallow recess having a shape and dimensions substantially identical to those of the at least one projecting part and a depth, measured perpendicularly to the first and second faces, substantially identical to a height (H) of the at least one projecting part measured perpendicularly to the first and second faces; and
   iv)—within the said second cavity there being present, corresponding to the at least one first cavity, at least one relief, having a shape and dimensions substantially identical to those of the at least one first cavity and height substantially identical to a depth (R) of the first cavity measured perpendicularly to the first and second faces, so that the at least one second cavity and the at least one relief define a receiving seat for the dampening element and wherein the at least one projecting part occupies a substantial part of the first face, while the at least one second cavity occupies a corresponding substantial part of the second face; and wherein said at least one first cavity, at least one second cavity, the at least one projecting part and at least one relief are formed such that a same mass of steel missing from the second face due to the at least one second cavity forms the at least one projecting part on the first face and a same mass of steel missing from the first face due to the at least one first cavity forms the at least one relief in the second cavity of the second face, and thereby creating an overall balanced geometry.

2. The metallic support according to claim 1, wherein the support is made from a sheared steel sheet and in that said at least one relief, said at least one first, said at least one second cavity and said at least one projecting part were obtained by plastic deformation with the same fine shearing operation by which the support itself is obtained from the steel sheet, in order to move the same mass of steel from the second face to the first face.

3. The metallic support according to claim 1, wherein a plurality of first cavities defining a plurality of first shallow recesses on the first surface are arranged within the at least one projecting part, directly corresponding to a plurality of reliefs present within the at least one second cavity.

4. The metallic support according to claim 1, wherein the at least one projecting part is shaped to reproduce a perimeter profile (P1) of the first portion of the first face delimited at least in part by said peripheral edge and to remain spaced apart from the perimeter profile, radially on the inside so that the at least one projecting part in use is entirely embedded within the block or layer of friction material.

5. The metallic support according to claim 1, wherein said first and second faces, said first surface and respective bottom walls of the at least one first and second cavities are substantially flat and parallel to each other.

6. The metallic support according to claim 1, wherein the metallic support is used on a brake pad.

7. The metallic support according to claim 6, wherein the metallic support is used as the back plate of a brake pad.

8. A brake pad for a vehicle, comprising:
a metallic support in a substantially flat plate form delimited between a first and a second face substantially flat and parallel to each other and a peripheral edge substantially perpendicular to the first and second faces and extending in one direction of a thickness (S) of the metallic support, a block or layer of friction material applied on a first portion of the first face delimited at least in part by the peripheral edge; and
a dampening element applied to the second face; wherein:
i)—the first portion of the first face is provided with at least one projecting part that cantilevers from the first face at least partly parallel to the peripheral edge, but spaced apart from the peripheral edge, so that the at least one projecting part is completely embedded in the block or layer of friction material, the at least one projecting part being delimited at the top by a first surface substantially parallel to the first face;
ii)—at least one first cavity present within the at least one projecting part and defining on the first surface, a first shallow recess delimited by a bottom wall substantially parallel to the first face, the at least one first recess being filled by the block or layer of friction material;
iii)—the second face being provided with at least one second cavity defining on the second face, a second shallow recess having a shape and dimensions substantially identical to those of the at least one projecting part and a depth, measured perpendicularly to the first and second faces, substantially identical to a height (H) of the at least one projecting part measured perpendicularly to the first and second faces;
iv)—within said at least one second cavity there being present, corresponding to the at least one first cavity, at least one relief having a shape and dimensions substantially identical to those of a first cavity and height substantially identical to a depth (R) of the first cavity measured perpendicularly to the first and second faces, so that the at least one second cavity and the at least one relief define a seat in which the dampening element is housed and wherein the at least one projecting part is shaped to reproduce a perimeter profile (P1) of the first portion of the first face delimited at least in part by the peripheral edge and to remain spaced apart from the perimeter profile, radially on the inside so that the at least one projecting part is entirely embedded within the block or layer of friction material.

9. The brake pad for a vehicle according to claim 8, wherein the dampening element is made in a sheet form and has at least one perforation, which has a conjugated shape to that of the at least one relief and engages the at least one relief, to hold the dampening element in place in the seat.

10. The brake pad for a vehicle according to claim 8, wherein the at least one second cavity has a depth substantially equal to or slightly less than the thickness of the dampening element measured perpendicularly to the first and second faces.

11. A method for obtaining a metallic support intended for a vehicle braking element comprising:
a fine shearing operation to separate from a sheared steel sheet, the metallic support,
simultaneously with the fine shearing operation, plastically deforming a first and second face of the metallic support to move the same mass of steel from the second face to the first face to implement on the first face at least one relief provided within at least one first cavity, and to implement on the second face, at least one second cavity on the inside with at least one projecting part and wherein at least one projecting part occupies a substantial part of the first face, and the at least one second cavity occupies a corresponding substantial part of the second face; and wherein the at least one first cavity, the at least one second cavity, the at least one projecting part, and the at least one relief are obtained such that a same mass of steel is removed from the second face in order to form the at least one projecting part on the first face and a same mass of steel is removed from the first face to form the at least one relief in the at least one second cavity of the second face, thereby creating a balanced metallic support.

12. A method for obtaining a metallic support intended for a vehicle braking element, comprising:
submitting a steel sheet to a fine shearing operation to separate from the steel sheet, a metallic support delimited between a first and a second face, designed to receive, respectively, a block or layer of friction material and a dampening element and a peripheral edge extending between the first and the second face in one direction of a thickness (S) of the metallic support substantially perpendicularly to the first and second faces, during the fine shearing operation, plastically deforming within a perimeter profile (P) of the metallic support defined by the peripheral edge whereby the same mass of steel is moved between the second face and the first face, in order to form:

at least one projecting part on the first face that cantilevers from the first face that is at least partially parallel to the perimeter profile (P) of the peripheral edge, but spaced apart from the peripheral edge and is delimited at the top by a first surface substantially parallel to the first face;

at least one first cavity within the at least one projecting part, defining a first shallow recess on the first surface delimited by a bottom wall substantially parallel to the first face;

at least one second cavity on the second face defining a second shallow recess having a shape and dimensions substantially identical to those of the at least one projecting part and a depth, measured perpendicularly to the first and second faces, substantially identical to a height (H) of the at least one projecting part measured perpendicularly to the first and second faces; and at least one relief within the said second cavity and corresponding to the at least one first cavity, the at least one relief having a shape and dimensions essentially identical to those of the at least one first cavity and height substantially identical to a depth (R) of the first cavity measured perpendicularly to the first and second faces and in which the at least one projecting part is shaped to reproduce the perimeter profile (P1) of the first portion of the first face delimited at least in part by said peripheral edge and to remain spaced apart from the perimeter profile, radially on the inside so that the at least one projecting part can be entirely embedded within the block or layer of friction material.

13. A metallic support for vehicle braking elements, said metallic support comprising:

a first face designed to receive on a first portion, a block or layer of friction material; and a second face, substantially parallel to the first face, designed to receive a dampening element, the first and the second faces being delimited laterally by a peripheral edge of the metallic support extending between the first and second faces in one direction of a thickness of the metallic support substantially perpendicular to the first and second faces; wherein:

i)—the first portion of the first face is provided with at least one projecting part that cantilevers from the first face at least partly parallel to a perimeter profile (P) of the peripheral edge, but spaced apart from the peripheral edge and that is delimited at the top by a first surface substantially parallel to the first face;

ii)—at least one first cavity is within the at least one projecting part and defines on the first surface, a first shallow recess delimited by a bottom wall substantially parallel to the first face;

iii)—wherein the second face is provided with at least one second cavity defining on the second face, a second shallow recess having a shape and dimensions substantially identical to those of the at least one projecting part and a depth, measured perpendicularly to the first and second faces, substantially identical to a height (H) of the at least one projecting part measured perpendicularly to the first and second faces; and iv)—within the at least one second cavity there being present, corresponding to the at least one first cavity, at least one relief, having a shape and dimensions substantially identical to those of the at least one first cavity and height substantially identical to a depth (R) of the at least one first cavity measured perpendicularly to the first and second faces, so that the at least one second cavity and the at least one relief define a receiving seat for the dampening element and wherein the at least one projecting part occupies a substantial part of the first face, while the at least one second cavity occupies a corresponding substantial part of the second face; and in that arranged within the at least one projecting part are a plurality of first cavities defining a plurality of first shallow recesses on the first surface, corresponding to a plurality of reliefs present within the second cavity.

14. A method for obtaining a metallic support intended for a vehicle braking element, said method comprising:

a fine shearing operation to separate from a sheared steel sheet the metallic support, simultaneously with the fine shearing operation, plastically deforming a first and second face of the metallic support to move the same mass of steel from the second face to the first face to implement on the first face at least one relief provided within at least one first cavity, and to implement on the second face, at least one second cavity on the inside with at least one projecting part wherein the at least one projecting part occupies a substantial part of the first face, while the at least one second cavity occupies a corresponding substantial part of the second face; and arranging a plurality of first cavities within the at least one projecting part, the plurality of first cavities defining a plurality of first shallow recesses on the first surface, corresponding to a plurality of reliefs present within the second cavity.

* * * * *